United States Patent [19]

Fischer

[11] Patent Number: 5,661,735
[45] Date of Patent: Aug. 26, 1997

[54] FDIC METHOD FOR MINIMIZING MEASURING FAILURES IN A MEASURING SYSTEM COMPRISING REDUNDANT SENSORS

[75] Inventor: Harald Fischer, Freiburg, Germany

[73] Assignee: LITEF GmbH, Germany

[21] Appl. No.: 578,840

[22] Filed: Dec. 26, 1995

[30] Foreign Application Priority Data

Dec. 27, 1994 [DE] Germany ............ 44 46 900.4

[51] Int. Cl.[6] .................. G06F 11/00; G21C 17/00
[52] U.S. Cl. .............. 371/49.1; 371/67.1; 376/245; 367/124; 364/560; 364/571.02
[58] Field of Search .................. 371/49.1, 49.4, 371/50.1, 57.1, 64, 67.1, 25.1, 28; 395/184.01, 185.01; 376/245, 215, 216, 217; 367/124, 125; 364/560, 561, 562, 571.02, 571.03, 571.04, 571.07; 318/563, 564

[56] References Cited

U.S. PATENT DOCUMENTS

| 4,472,806 | 9/1984 | Blair ............................ 371/68 |
| 4,772,445 | 9/1988 | Nasrallah et al. ............ 376/245 |
| 5,479,161 | 12/1995 | Keyes et al. ............ 364/571.02 |

FOREIGN PATENT DOCUMENTS

| 0416370 | 3/1991 | European Pat. Off. . |
| 3327263 | 2/1984 | Germany . |
| 3929404 | 3/1991 | Germany . |
| 4100501 | 7/1992 | Germany . |
| 4310279 | 10/1993 | Germany . |
| 4244014 | 7/1994 | Germany . |
| WO9013794 | 11/1990 | WIPO . |

*Primary Examiner*—Robert W. Beausoliel, Jr.
*Assistant Examiner*—Trinh L. Tu
*Attorney, Agent, or Firm*—Elliott N. Kramsky

[57] ABSTRACT

A method for minimizing measured quantities determined from sensors affected by measuring failures and detected by a plurality of redundant sensors connected to form a measuring system by detecting and isolating the sensors affected by failures. Sensor values measured by all the sensors are mapped by a linear transformation into a vector in the parity space (parity vector). The dimension of the parity space is determined by the redundance of the measuring system (i.e., the number of sensors and the dimension of the quantity to be measured).

The subspaces at each failure level that contain the largest proportion of the measured parity vector are determined by projection of the measured parity vector onto all possible subspaces. The best sensor combination at each failure level can be determined by omitting the sensor combinations belonging to such subspaces.

5 Claims, 5 Drawing Sheets

FDIC METHOD FOR MINIMIZING MEASURING FAILURES IN A MEASURING SYSTEM COMPRISING REDUNDANT SENSORS

BACKGROUND

1. Field of the Invention

The present invention relates to a method for minimizing the contributions of failed sensors in a measurement system comprising a plurality of redundant interconnected sensors. More particularly, this invention is directed to minimizing measurement errors in such a system by detecting and isolating the faulty sensors employing failure detection, isolation and correction ("FDIC") methods.

2. Description of the Prior Art

When redundant sensors are provided for measuring a quantity, it is theoretically possible to detect failures in one or a number of such sensors by comparison of the data provided by the sensors. If the faulty sensors are additionally isolated, then it is possible to eliminate the measuring failure by omitting the sensors determined to be faulty.

This general problem occurs in a multiplicity of applications including, for example, measurement of movement with inertial systems containing redundant inertial sensors (e.g. gyroscopes and accelerometers possibly possessing nonparallel sensing axes), and position determination in satellite navigation systems having redundant satellite configurations. The existing methods for solving the problem can be broadly divided into two categories. These are (i) grouping of the system into sensor combinations of minimal redundance by determining all individual combinations and employing combinatorial logic to determining the largest possible failure-free sensor combination (i.e. "parity methods") and (ii) isolating the individual sensor that contributes most to the overall discrepancy (Chi-square criterion) followed by elimination of that sensor ("maximum likelihood" methods).

The known disadvantages of such methods are, in the case of parity methods:

(a) The number of individual combinations of minimal redundance required to be taken into account grows combinatorially (i.e. as n!) with the number of sensors. Since the parity of each combination must be evaluated, cost increases commensurately.

(b) Each individual parity is evaluated discretely as either "good" or "bad" by comparison with predetermined threshold values. A parity that only barely violates a threshold value is indistinguishable from a large threshold-value violation. The same is true of threshold-value undershoots. The resulting total pattern of the parity violations does not, therefore, permit unambiguous interpretation over a comparatively wide range of sensor failures, leaving interpretation to heuristic means. This can lead to unnecessary misinterpretations as the additional introduction of various ("large" and "small") threshold values can only party ameliorate the problem while increasing cost.

(c) Since the selection of threshold values is generally fixed, an unexpectedly high noise level of all the sensor values leads to complete failure as it is then possible that all individual combinations will exceed the threshold values with discrimination no longer taking place beyond them. The threshold values must be matched to the worst possible case to avoid this problem. This leads to undesirably high insensitivity of the method in "normal operation".

(d) As the individual parities are broadly divided into higher/lower than the threshold value, singularities (i.e. sensor data combinations that do not, in principle, permit unambiguous isolation of failure) can only be roughly detected and partly distinguished from unambiguous situations. The result of this is that either (1) singularities remain undiscovered or (2) cases that are actually unambiguous are treated as singularities. Failure to discover singularities can lead to incorrect decisions. Treating unambiguous cases as singularities can impair the integrity of the method since a less reliable information is generally relied upon in the treatment of singularities.

"Maximum likelihood" methods are subject to the following disadvantages:

(a) False isolation decisions can occur when multiple failures take place simultaneously since these methods are based upon the assumption that, at any particular given time, only one sensor delivers faulty data.

(b) After the occurrence and isolation of an individual failure, it is necessary to reconfigure the parameters of the method in real time to the corresponding (n−1) sensor configuration to detect and further isolate later-occurring individual failures. The subsequent faulty behavior of the previously-isolated sensors is no longer included in the new configuration. Possible "recovery" of such sensors can only be detected by parallel processing of a plurality of configurations. This correspondingly increases the processing costs.

SUMMARY AND OBJECTS OF THE INVENTION

It is therefore an object of the invention to provide an improved FDIC method that is free of the described shortcomings of prior art parity and maximum likelihood methods.

The present invention addresses the aforesaid object by providing a method for minimizing the contributions of sensors affected by possible measuring failures detected by a plurality of redundant interconnected sensors forming a measuring system by detecting and isolating the sensors affected by failures. The method is begun by mapping the sensor values measured by all of the sensors, which are combined to form a measured vector by means of a linear transformation, into a vector in a parity space (parity vector). The dimension of the vector space is determined by the redundance of the system.

Thereafter, the absolute magnitude of the parity vector is determined and compared with a first detection threshold. A failure-free state is concluded when the first detection threshold is not exceeded. In the event that the threshold is exceeded, the measured parity vector is projected onto all subspaces characteristic of possible failure states. The dimensions of the subspaces are determined by the number of possible faulty sensors associated with the respective failure state. In order to isolate the failures, the projection of the parity vector onto a subspace, respectively belonging to the relevant failure determination level, which provides the largest proportion of the measured parity vector, is established.

It is then tested to determine whether the remaining residual failure exceeds a second detection threshold. When the second detection threshold has not been exceeded, the best sensor combination is determined by omitting the sensor value combination belonging to the respective subspaces with the largest proportion of the parity vector at the relevant failure determination level. When the second detection threshold is exceeded, the measured parity vector is projected onto all subspaces characteristic of the possible failure states, the projection of the parity vector onto a subspace that provides the largest proportion of the measured parity vector established as before and the remaining residual failure tested to determine whether the next detection threshold is exceeded. This process continues until a detection threshold is not exceeded in which case the best sensor combination is determined by omitting the sensor value combination belonging to the respective subspaces with the largest proportion of the parity vector at the relevant failure determination level.

The method according to the invention essentially differs from the known parity and maximum likelihood methods in the following regards:

geometrical interpretation of the properties of the parity space and their consequent use for isolating simultaneously occurring multiple failures;

off-line analysis of the directions in the parity space and the provision of the isolation results in a precalculated table, optionally possible adaptive matching of the detection thresholds to the general noise level of the failure-free sensors.

The sensor values (measurement vector) measured by all the sensors are mapped by a linear transformation into a vector in the parity space. The dimension of the parity space is determined by the redundance of the measuring system, which is to say by the number of sensors and the dimension of the quantity to be measured. For example, with 8 non-parallel measuring axes for measuring a 3-dimensional movement quantity (for example speed of rotation or acceleration), the dimension of the associated parity space is equal to 5. A number of subspaces can be defined in this parity space, each of which is characteristic of a particular combination of sensor failures. In the case of the above-mentioned example of 8 individual sensor axes for measuring a 3-dimensional quantity, these subspaces are:

8 one-dimensional subspaces (lines) for characterizing uniaxial failures 28 two-dimensional subspaces (planes) for characterizing biaxial failures 56 three-dimensional subspaces for characterizing triaxial failures 70 four-dimensional subspaces for characterizing four-axis failures (Note: five-axis failures can still be detected, but not isolated, and failures relating to a larger number of axes cannot even be detected using the sensor system of this example.)

The subspaces characterize failure combinations in such a way that, when a particular failure combination is present, the resulting parity vector lies fully within the relevant subspace.

The principle of the method consists in determining, by projection of the measured parity vector onto all possible subspaces, which of the subspaces for each failure level (uniaxial, biaxial, . . . ) involves the greatest portion of the measured parity vector. By omitting the sensor combinations associated with these subspaces, the best sensor combination can then be determined at each failure level. The result of this failure isolation is independent of any threshold values, since it is not determined by the magnitude (length) of the measured parity vector, but only by its direction. The magnitude of the parity vector, or of the projection of the parity vector onto the subspaces, is only employed for failure detection; that is to decide whether a failure is present at all, or whether a single, double, triple failure, etc., should be assumed. (This decision, too, can be made without "a priori" threshold values, if the projections onto the subspaces with minimal redundance are optionally employed as a measure for these threshold values.)

Measures to improve efficiency are essential for actual practice of the principle in real-time processing. Since the failure isolation depends only on the direction of the parity vector, it is possible to calculate the projections of the parity vector onto the characteristic subspaces off line, outside the real-time application, and to provide the result of the failure isolation in a table. The cost to be expended in real time is then restricted to calculation of the parity vector and of a table key from the direction of the parity vector. By using the key, the results of the failure isolation are then called up from the table. In order to minimize the required table size, use may be made of the symmetries in the parity space, which are given from the symmetry of the sensor axial arrangement.

The preceding and other objects and advantages of the present invention will become further apparent from the detailed description that follows. Such description is accompanied by a set of drawing figures. Numerals of the drawing figures, corresponding to those of the written description, point to the features of the invention. Like numerals refer to like features throughout both the written description and the drawing figures.

DETAILED DESCRIPTION OF THE PREFERRED EMBODIMENT

Figure 1:
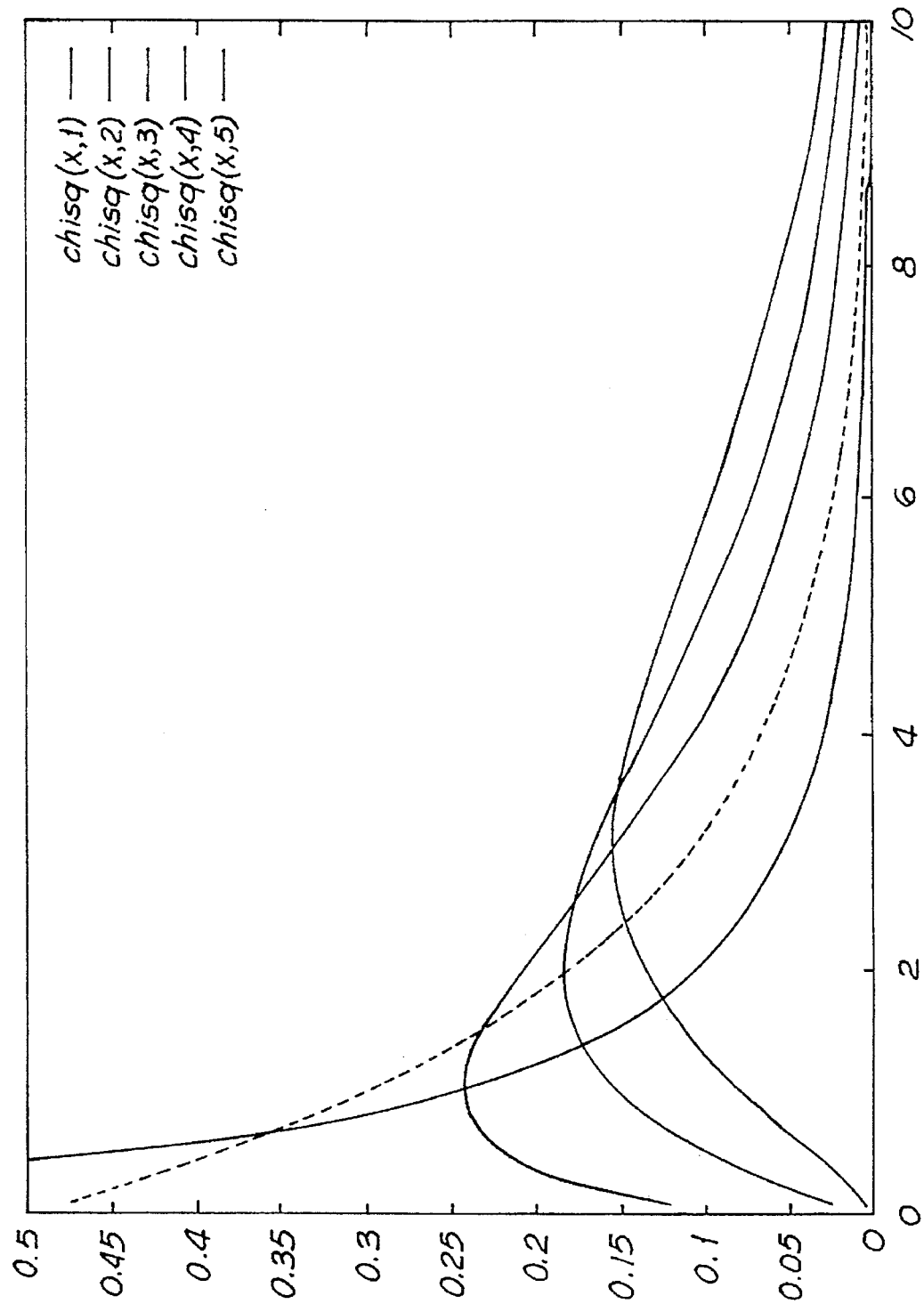
FIG. 1 is a graph of the statistical (Chi-square) density distributions of the resulting lengths of parity vectors for 1 degrees to 5 degrees of freedom.

The method of the invention is described below in three sections ("A", "B" and "C"). Section A describes basic principles. The implementation of the failure-detection method is described in section B with the aid of flow charts. Finally, two applications are presented in section C.

A. BASIC PRINCIPLES

The basic principle underlying the invention is the existence of a linear or linearized relationship in the failure-free case between quantities to be determined and sensor values measured. Thus, $$s = Ax + e \qquad (1)$$

Where s indicates the sensor values combined to form measurement vectors, x is the quantity to be measured and e indicates a sensor failure. The matrix A describes the relationship between the two for the failure-free case.

The estimated value of the quantity to be measured is given by the measured sensor values according to the following:

$$f = Hs$$

$$H = (A^T A)^{-1} A \qquad (2)$$

Where H, pseudoinverse of the matrix A, provides the linear least squares fit. It is assumed below that the relevant inverse exists (i.e., the measured quantity can be determined).

With regard to "residues" (i.e., deviations between actual sensor values (affected by failures) and the sensor values associated with the estimated measured value), the following equation applies;

$$\begin{aligned} r &= s - A\hat{x} \\ &= (1 - AH)s \\ &= Rs \end{aligned} \qquad (3)$$

The magnitude of the residue vector r is a measure of the consistency of the sensor data. That is, with fully consistent sensor data, r is equal to zero, while it differs from zero when the sensor data are affected by failures. In principle, the value of r allows conclusions to be drawn regarding the failure. For efficient analysis of sensor data consistency, r is not directly taken as a starting point. Rather, R is firstly diagonalized according to $$R = V^2 \begin{pmatrix} \lambda_1 & 0 & \ldots & 0 \\ 0 & \lambda_2 & \ldots & 0 \\ \vdots & & \ddots & \vdots \\ 0 & \ldots & 0 & \lambda_x \end{pmatrix} V \qquad (4)$$

R is by definition real and symmetrical, so that diagonalization is always possible. In addition, it is a property of the eigenvalues $\lambda_i$ that they can only assume the values of 0 and 1. The degeneracy of the eigenvalue 0 is determined by the dimension of the measured quantity while that of the eigenvalue 1 is determined by the number of redundant sensors. For the decomposition of R according to equation 4, this means that, in the matrix V, only the rows with the eigenvalues 1 contribute to R. Let m be the dimension of the quantity to be measured and n be the number of sensors, then the dimension of the matrix V is (n−m)×m, and the (n−m) rows of V can be constructed from an orthonormalized set of eigenvectors of R with the eigenvalue 1.

The matrix V has the following properties $$\begin{aligned} V^T V &= R \\ VV^T &= 1 \\ RV^T &= V^T \\ VR &= V \\ VH^T &= 0 \\ HV^T &= 0 \\ VA &= 0 \end{aligned} \qquad (5)$$

The mapping $$p = Vs \qquad (6)$$

defines, for a measured vector s, a parity vector p that contains all the information regarding the failure state of the sensor value.

In particular, $$r^T r = p^T p \qquad (7)$$

that is, the length of the residue vector r is equal to the length of the parity vector p and serves as a measure of the consistency of the sensor combination containing all sensors.

A conclusion can be drawn from the direction of p as to which sensors contribute how much to the overall failure. If, for example, a single failure is present in sensor i, then the parity vector determined according to equation 6 lies wholly in the direction defined by the ith column of V. In the event of a double failure (i.e., in the sensors i and j), the resulting parity vector lies in the plane spanned by the ith and jth columns of V. The column vectors of the matrix V thus define characteristic subspaces containing the resulting parity vector for particular failure combinations. The assignment of subspaces of the parity space to failure combinations can be continued with an increasing number of sensors affected by failures for as long as the number of associated column vectors does not yet span the entire parity space. In the case of n sensors and an m-dimensional measured quantity, the dimension of the parity space is (n−m) and the matrix V consists of n characteristic column vectors. Only (n−m) column vectors are required to span the parity space fully (i.e., it is possible to isolate failures in up to (n−m−1) sensors).

In order to test the hypothesis that failures are present in a particular combination k of sensors, one of the projections $$p_k = C_k p$$

$$o_k = O_k p \qquad (8)$$

with the property $$o_k^T o_k + p_k^T p_k = p^T p \qquad (9)$$

is formed, the rows of the transformation matrix $C_k$ being formed by orthonormalization of the column vectors of V involved in the combination k. The corresponding transformation $O_k$ projects onto the respective orthogonal subspace. The relationship of equation 9 can be used to determine only the projection onto the subspace with smaller dimensionality. As a result, the processing cost is reduced.

The following consistency criteria are satisfied: The quantities $$e_k = p_k^T p_k$$

$$\delta_k = p^T p - p_k^T p_k \qquad (10)$$

are a measure of which portion of the observed inconsistency is due to the sensors involved in the combination k, or still remains if these sensors are omitted.

The total number K of sensor combinations whose failures can, in principle, be isolated is given by $$K = \sum_{f=0}^{n-m-1} \binom{n}{f} \qquad (11)$$

The summand in each case describes the number of combinations (f of n) associated with a failure level f. The summation runs from the failure-free case (f=0) to the minimum required residual redundancy (f=n−m−1). For each of these sensor failure combinations, the consistency of the remaining sensors can be determined according to equation 8, and, by comparison with a threshold value dependent on the failure level, a decision can be made as to whether the sensor combination remaining in each case affords acceptable consistency. In particular, it is also possible to sort the sensor combination at each failure level in order of increasing inconsistency, and at each failure level to determine the combination with the best consistency. An important property of the parity vector, which is used in a practical embodiment of the method, is that the relative magnitudes of the inconsistencies for the various sensor combinations are determined solely by the orientation of the parity vector in the parity space. The absolute magnitude is given by a common factor from the magnitude of the parity vector. The latter does not, however, have any influence on the order of the sensor combinations sorted according to inconsistencies.

Singularities:

Under particular failure conditions it is possible for a plurality of different sensor combinations to give an acceptable consistency for one failure level or for the best consistency not to be determined unambiguously, in such a way that two different sensor combinations provide consistency values which are very close to the maximum. In the geometrical interpretation of the parity space, this case corresponds to the situation that the parity vector determined from the measured vector lies at the intersection of two (or more) characteristic subspaces. Should this occur at the maximum failure level, then there is a singularity, and unambiguous failure isolation only on the basis of the currently measured sensor values is not possible. An isolation decision may then possibly be made using the data of earlier processing cycles, for example such that an earlier, unambiguously made isolation decision is retained, if this also delivers an acceptable consistency for the current singularity case. Otherwise, additionally available status information regarding the individual sensors is employed to resolve singularities.

Threshold Value Determination:

In the establishment of detection thresholds as acceptance criteria for the inconsistencies of the remaining sensor combinations at the various failure levels ("threshold values"), account must be taken of the fact that even failure-free sensors do not deliver absolutely consistent measured data, but they are affected by some inaccuracies. The inaccuracies of the failure-free sensors establish a lower limit for the threshold values to be selected, it also being possible to take into account a safety factor to avoid false alarms. The safety factor is determined by the statistical distribution of the inaccuracies of failure-free sensors and the required maximum false alarm rate.

An upper limit for the threshold values to be selected is given by the external accuracy requirements of the application. Such requirements establish which failures in the measured quantity to be determined can still be accepted or at what rate missed detection is permissible.

A prerequisite of a technically meaningful application is that the inaccuracies of the failure-free sensors permit a sufficiently accurate determination of the measured quantity. That is, the upper limit of the threshold values must lie considerably above the abovementioned lower limit.

If an independent, statistical normal distribution (with variance 1, to which the threshold values are then related) is in each case assumed for the inaccuracies of the failure-free sensors, then a Chi-square distribution with degree of freedom $v=(n-m)$ results from equation 7 for the statistical density distribution of the resulting length of the parity vector.

$$f(x,v) = \frac{x^{v/2-1} \exp(-x/2)}{2^{v/2}\Gamma(v/2)} \quad (12)$$

Figure 2:
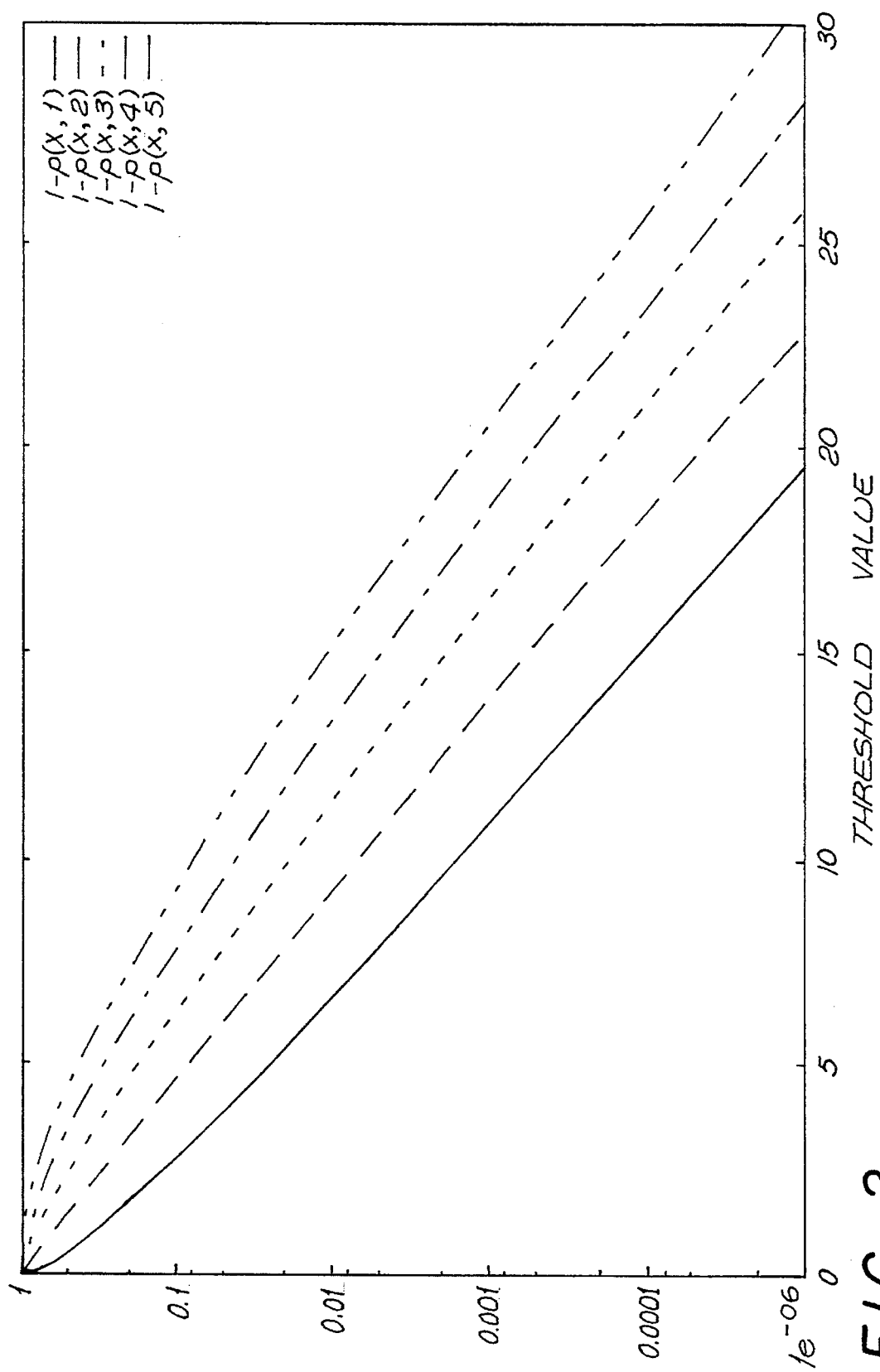
FIG. 2 is a graph of false-alarm probability as a function of predeterminable threshold values for various degrees of freedom.

This density distribution is represented in FIG. 1 for various degrees of freedom. In the case of failure-free sensors, this corresponds to the statistical distribution of the remaining inconsistencies $\delta_\chi$ at the various failure levels. For each degree of freedom they are respectively equal to the degree of freedom. The lower limits for the threshold values $S^{min}$ for a predetermined, maximum permissible false alarm rate $P_f$ are determined by $$P_f = 1 - \int_0^{S_v^{max}} f(x,v)dx \quad (13)$$

and the upper limits for the threshold values $S^{max}$ can, with a maximum permissible failure $\Delta x_i$ of the ith component of the measured quantity to be determined, be estimated as $$S_v^{max} = \frac{\Delta x_i^2}{\sum_{j=1}^{n} H_{ij}^2} \quad (14)$$

Where $H_{ij}$ are the elements of the least squares transformation matrix. The graph of FIG. 2 gives the relationship between selected threshold value (in units of $\sigma^2$ of the sensor inaccuracy) and the resulting false alarm probability.

Under nominal conditions (i.e., if the sensor inaccuracy of the failure-free sensors has the assumed distribution), then the threshold values determined in this way affect the desired false alarm rate and failure limits for the measured quantity. However, under circumstances in which (temporarily) all of the sensors exhibit larger inaccuracies than assumed, undesired failure detections can occur. To avoid this, the threshold values can be dynamically matched to the lowest inconsistency of the highest failure level (i.e., to the inconsistency of the best sensor combination) with the minimum number of redundant sensors. Instead of the above-described threshold values $S^{nom}$, threshold values of the form $$S_v = \max[S_v^{nom}, a \cdot \min[\delta_k]] \quad (15)$$

are then selected, where a is chosen as a function of the failure level, or of the degree of freedom, for example such that $$a = v + 1$$

The effect of selection of the threshold values is that, even with unexpectedly high inaccuracy of all sensors, the method accepts the best sensor combination, at the latest, at the maximum failure level. Even failures at the lower failure levels are only detected when individual sensors are actually significantly less accurate.

B. IMPLEMENTATION OF THE METHOD

Figure 3:
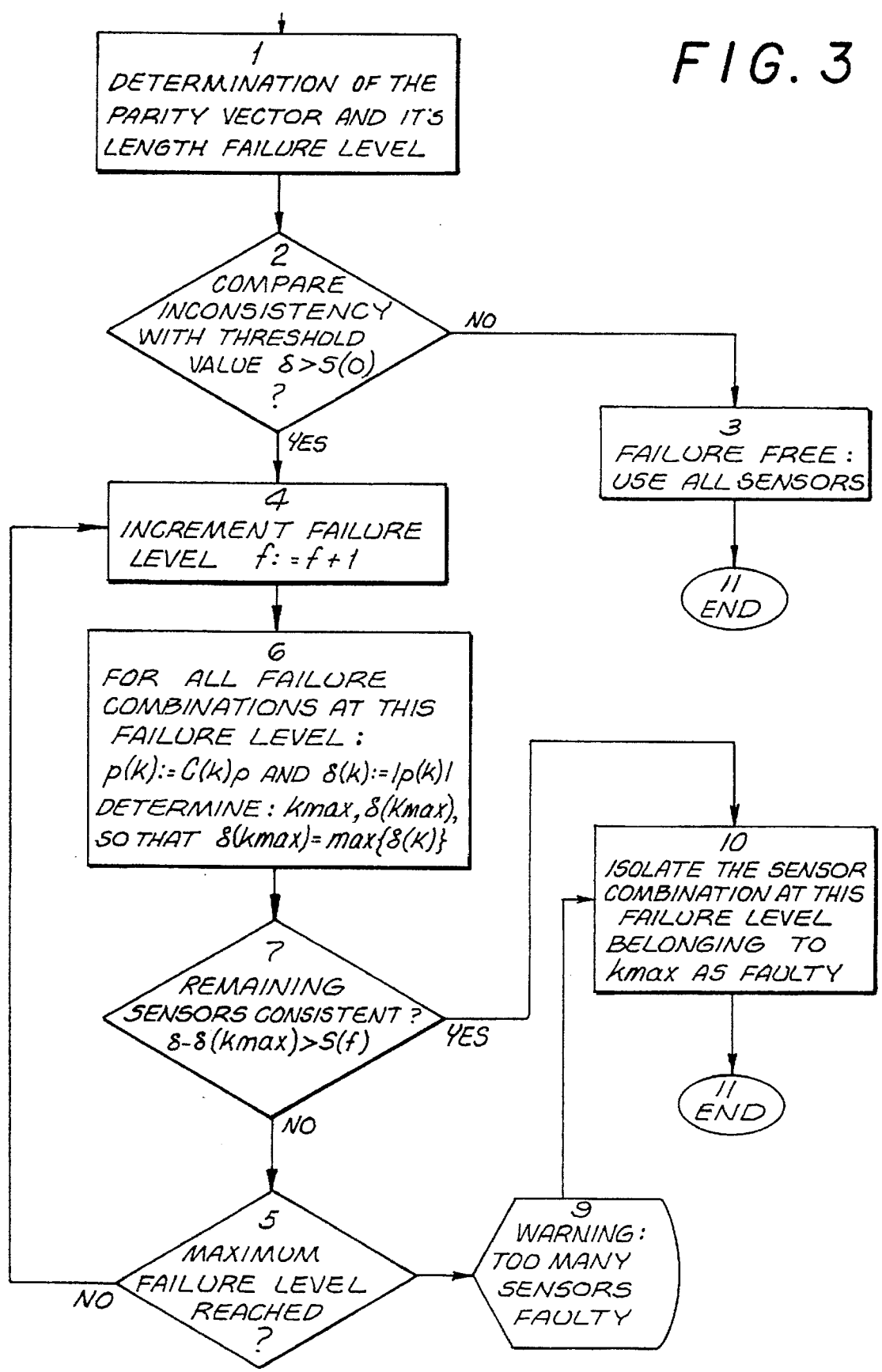
FIG. 3 is a flow chart for illustrating the method of the invention.

It is not generally required to evaluate respectively all sensor combinations or sensor failure combinations to carry out the failure detection and isolation method. Rather, the method schematically represented in the flow chart of FIG. 3 can be employed. In this, the parity vector is first determined (box 1) and the consistency of the overall sensor combination calculated therefrom.

Whether the consistency of the overall sensor combination is acceptable is detected (box 2) by comparison with a threshold value which is selected specifically for the failure level f (here f=0). If acceptable, then all sensors are sufficiently failure-free and can be employed to determine the measured quantity (box 3). The method (for the current processing cycle) is then terminated. Otherwise, the sensor combinations of the failure level 1, which result from omission of one sensor in each case, are first evaluated (box 6), and the best sensor combination at this failure level is determined. Should this best sensor combination be acceptable (i.e., the remaining inconsistency lies below a threshold value (dependent on the failure level) (box 5)), then the isolation decision can be terminated with the best sensor combination at this failure level (box 10).

Otherwise, a test is carried out as to whether the maximum failure level has already been reached (box 5), and, if this is not the case, such method is continued for the next higher failure level (box 4). If the maximum failure level is reached without sufficient consistency determined in the remaining sensors at the maximum failure level, it is assumed that too many sensors are faulty. The best sensor combination at the maximum failure level is isolated as an "emergency solution". This case can only occur if the threshold values of the individual failure level are rigidly predetermined and are not dynamically matched.

Figure 4:
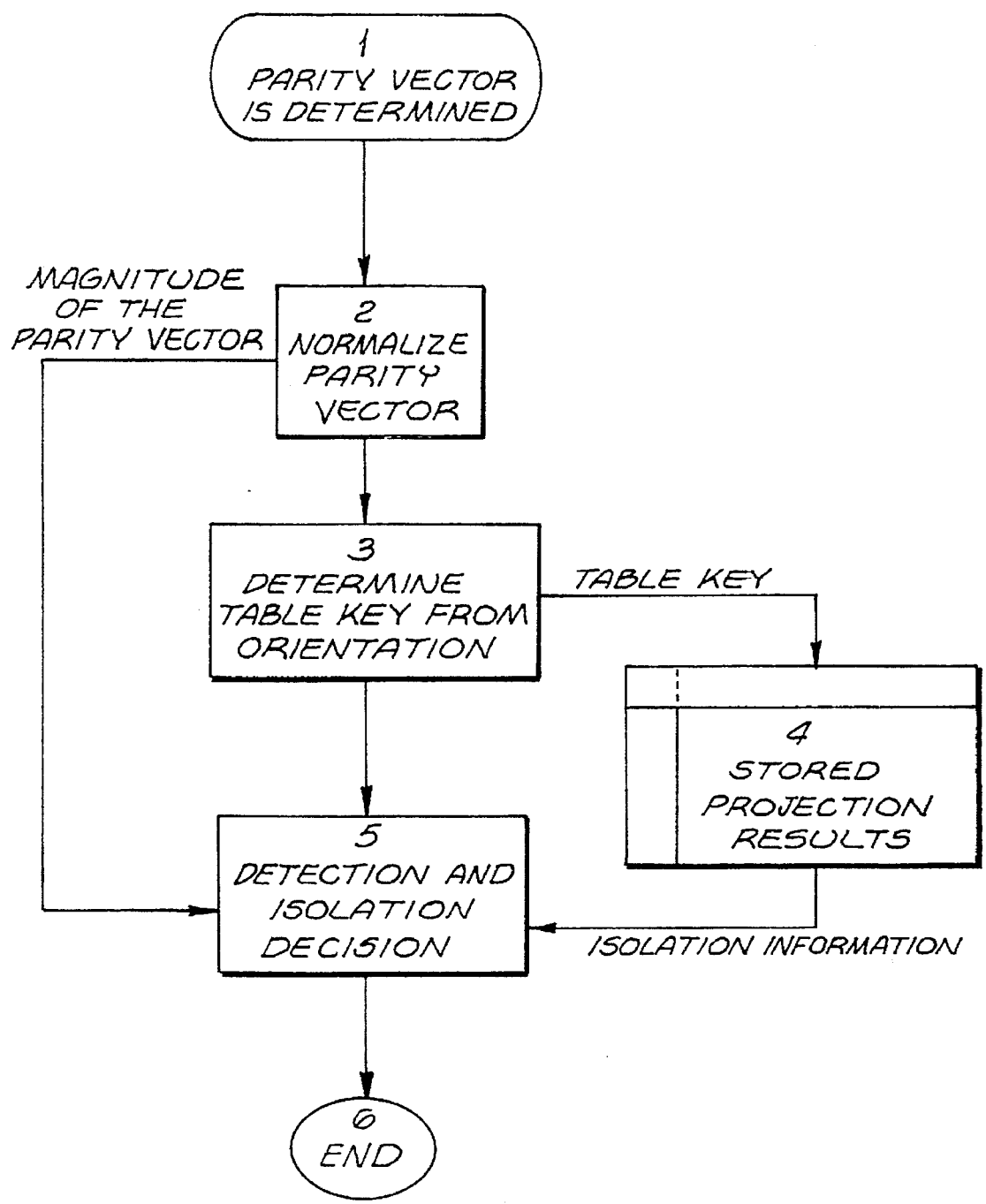
FIG. 4 is a flow chart of the method of the invention in accordance with an alternative embodiment that includes stored isolation detection.

For applications in which the geometry of the sensor system, and therefore also the geometry of the characteristic subspaces in the parity space, do not change at all or only slowly compared to the required processing frequency, a method in accordance with FIG. 4 can be selected to increase the efficiency further.

After the parity vector has been determined from the sensor values (box 1), the norm of the parity vector is determined and the parity vector is suitably normalized (box 2). A normalization particularly suitable for these purposes consists of normalizing the component with maximum magnitude to the value +1 by multiplication of all components by a factor. The index of the maximum component serves as a first element in the table key. The remaining portion of the table key is then obtained from the remaining components of the parity vector by quantizing the respective value range $[-1, +1]$ into q equal sections. A table formed in this way then has, in the case of a d-dimensional parity space and a quantization of the components into q sections, $$Z = d q^{d-1}$$

entries, which respectively code for one direction of the parity vector. This number gives an upper limit, which can be further reduced by exploiting possible application-specific symmetries in the parity space.

After the table key has been determined from the components of the parity vector (box 3), isolation information stored under this key is called up (box 4). At each table key (direction of the parity vector), the f respective best sensor combinations are provided in order of increasing inconsistency for each failure level f.

For the detection and isolation decision (box 5), only these respective best sensor combinations are then evaluated, by projection of the parity vector onto the associated subspaces, at each failure level. In this case, the sequence of the above-described stepped method can then again be used.

The sensor combination to be used is then selected independent of the method used to establish the consistency of the sensor combinations. Each sensor combination has its own least squares transformation matrix $H_i$, in which the sensors to be omitted are no longer taken into account, and the value of the quantity to be measured is given from the measured vector according to equation 2.

C. APPLICATION EXAMPLES

Four thermometers:

In this example, the application for a particularly simple case is demonstrated. In it redundant sensors are used for measuring a scalar (1-dimensional) measured quantity. In the example, 4 sensors were chosen, so that it is even possible to isolate simultaneously occurring double failures and, on the other hand, the parity space, which, in this case, is three-dimensional, still gives clear ideas regarding the geometry in the parity space. Instead of the thermometers, mentioned here, for measuring temperature, it is equally possible to consider any other scalar measured quantities/sensors. The relationship between the temperature and the measured value $T_i$ is $$\begin{pmatrix} T_1 \\ T_2 \\ T_3 \\ T_4 \end{pmatrix} = \begin{pmatrix} 1 \\ 1 \\ 1 \\ 1 \end{pmatrix} \cdot t$$

Then $$H = \begin{pmatrix} \frac{1}{4} & \frac{1}{4} & \frac{1}{4} & \frac{1}{4} \end{pmatrix}$$

and $$R = \begin{pmatrix} \frac{3}{4} & -\frac{1}{4} & -\frac{1}{4} & -\frac{1}{4} \\ -\frac{1}{4} & \frac{3}{4} & -\frac{1}{4} & -\frac{1}{4} \\ -\frac{1}{4} & -\frac{1}{4} & \frac{3}{4} & -\frac{1}{4} \\ -\frac{1}{4} & -\frac{1}{4} & -\frac{1}{4} & \frac{3}{4} \end{pmatrix}$$

with a $$V = \begin{pmatrix} -\frac{1}{2} & \frac{1}{2} & -\frac{1}{2} & \frac{1}{2} \\ \frac{1}{2} & \frac{1}{2} & -\frac{1}{2} & -\frac{1}{2} \\ -\frac{1}{2} & \frac{1}{2} & \frac{1}{2} & -\frac{1}{2} \end{pmatrix}$$

The number of possible, isolatable failure combinations is K-11, and the corresponding combinations, with the associated projection matrices, are given in the following table. A projection onto the subspace of smaller dimension is chosen in each case.

TABLE 1

Projection matrices for the characteristic subspaces of the 4-thermometer example.

| Number of faulty sensors | Faulty sensor(s) | Projection matrices |
|---|---|---|
| 1 | 1 | $C_k = \frac{1}{\sqrt{3}} \cdot (-1\ 1\ -1)$ |
| 1 | 2 | $C_k = \frac{1}{\sqrt{3}} \cdot (1\ 1\ 1)$ |
| 1 | 3 | $C_k = \frac{1}{\sqrt{3}} \cdot (-1\ -1\ 1)$ |

TABLE 1-continued

Projection matrices for the characteristic subspaces of the 4-thermometer example.

| Number of faulty sensors | Faulty sensor(s) | Projection matrices |
|---|---|---|
| 1 | 4 | $C_k = \frac{1}{\sqrt{3}} \cdot (1\ -1\ -1)$ |
| 2 | 1,2 | $O_k = \frac{1}{\sqrt{2}} \cdot (1\ 0\ -1)$ |
| 2 | 1,3 | $O_k = \frac{1}{\sqrt{2}} \cdot (0\ 1\ 1)$ |
| 2 | 1,4 | $O_k = \frac{1}{\sqrt{2}} \cdot (1\ 1\ 0)$ |
| 2 | 2,3 | $O_k = \frac{1}{\sqrt{2}} \cdot (1\ -1\ 0)$ |
| 2 | 2,4 | $O_k = \frac{1}{\sqrt{2}} \cdot (0\ 1\ -1)$ |
| 2 | 3,4 | $O_k = \frac{1}{\sqrt{2}} \cdot (1\ 0\ 1)$ |

Figure 5:
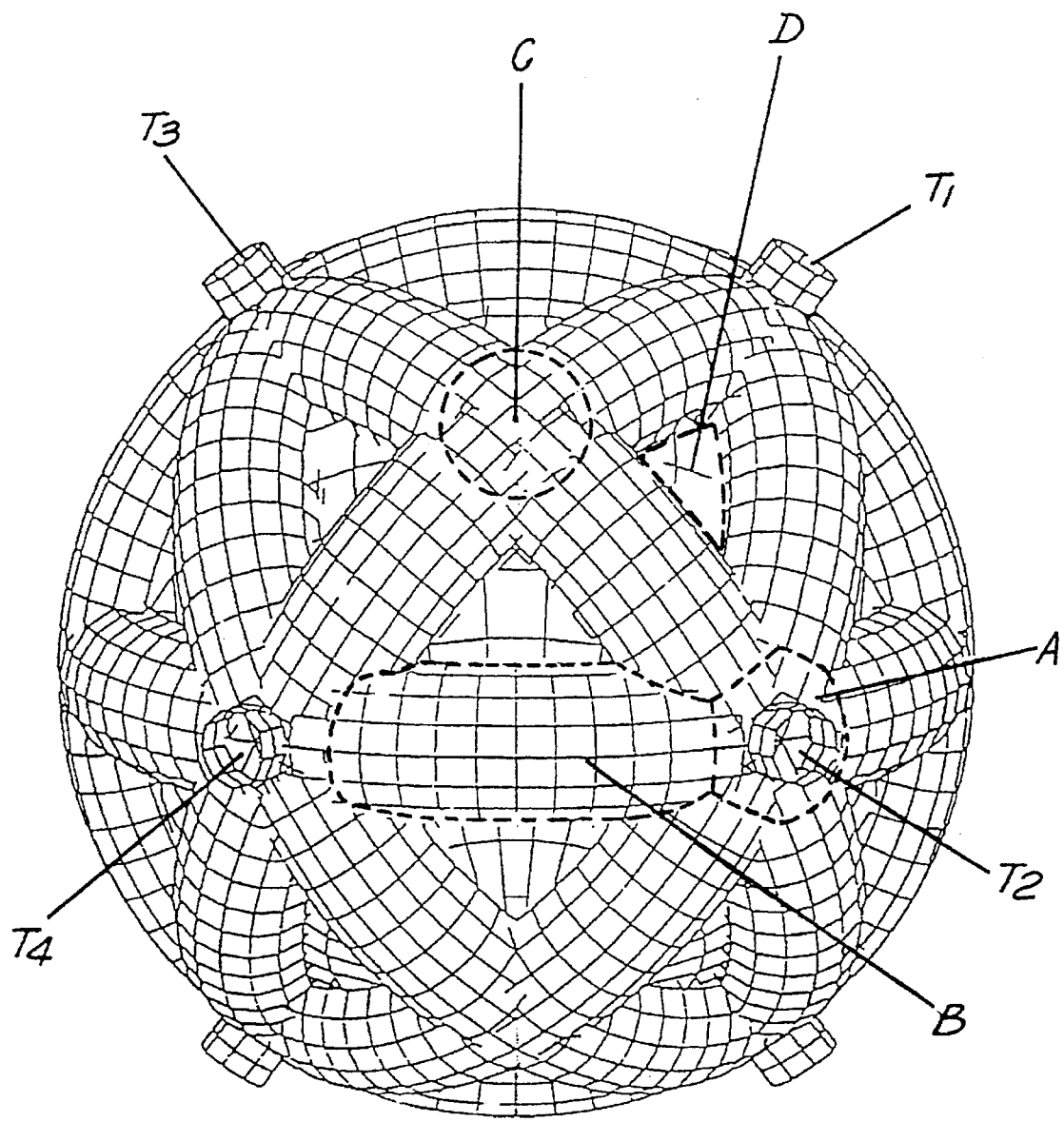
FIG. 5 is an illustration of the parity space in which four sensors are provided to measure a scalar quantity.

FIG. 5 illustrates the geometrical conditions in the three-dimensional parity space for the preceding example including four thermometers. The four characteristic directions for individual failures lie along the space diagonals (regions A) defined by the four thermometers T1 to T4. Six planes in all are spanned by the four directions, and the planes correspond to the double failures (regions B), the width of the indicated "bulge" specifying the magnitude of the permissible establishable inaccuracies of failure-free sensors. The intersections of the planes define the singularity regions in which unambiguous double failure isolation is not possible (regions C). If the direction of the parity vector lies in the remaining regions of the represented sphere (regions D), then there exists a failure in more than two thermometers, which can no longer be isolated. The width of the regions depends on the inaccuracy assumed for failure-free sensors. In the representation of FIG. 5 only a typical region is represented, by bold interrupted bordering, for each region. Position determination by measuring the pseudodistance to navigation satellites:

In this case, position determination from measured "pseudodistances" is considered. The measurement equation is of the form (after conventional linearization by a known approximated value for the position), in the case of n observed satellites $$s = Ax$$

$$\begin{pmatrix} s_1 \\ \cdot \\ \cdot \\ \cdot \\ s_n \end{pmatrix} = \begin{pmatrix} a_{1x} & a_{1y} & a_{1z} & 1 \\ \cdot & & & \\ \cdot & & & \\ \cdot & & & \\ a_{xx} & a_{xy} & a_{xz} & 1 \end{pmatrix} \begin{pmatrix} x \\ y \\ z \\ c \cdot \delta t \end{pmatrix}$$

$$a_{tx}^2 + a_{ty}^2 + a_{tz}^2 = 1$$

The components $s_i$ of the measured vector characterize the measured pseudodistances to the individual satellites. x, y, z and δt characterize the components of the positional correction, or the failure in the receiver clock. The first three elements of each row of the measured matrix are the direction cosines of the connecting line between the satellite and the approximated position. Since, in this case, the measured matrix A changes as a function of the respective satellite constellation, further procedures must be dynamically carried out for failure detection and isolation, i.e., for calculation of the parity transformation V. In this case, however, it is substantially possible to resort to quantities already determined for the position determination.

In any case, the transformation matrix $$H = (A^T A)^{-1} A$$

is determined, from which the residue matrix R can be determined, by $$R = 1 - AH$$

An orthonormal set of eigenvectors of R with eigenvalue 1 can be determined by means of standard numerical methods. The eigenvectors, as row vectors, respectively form the rows of the matrix V. The parity vector determined by $$p = V s$$

is then projected onto the characteristic subspaces, determined by the permissible satellite combinations, and an optimally consistent satellite combination is determined. When determining the permissible satellite combinations, care should be taken to consider only such combinations with a sufficient DOP value.

Because of the changing satellite constellation, there is no possibility of an off-line precalculation of a decision table, in which an isolation decision for all directions of the parity vector is stored. However, such a calculation can be carried out by a background task, since the satellite constellation only changes slowly.

The improvements which can be achieved with this method are:

Failure isolation takes place without threshold values, which is to say that it can take place without "a priori" assumptions regarding the actual noise of the failure-free sensors.

During isolation of the failure, apparent singularities are avoided and actual singularities are detected as such.

In contrast to existing parity methods, the processing cost needed in real time for failure detection and isolation is in principle determined only by the dimension of the parity space, and is independent of the number of possible sensor combinations. Thus, for example, the 163 possible combinations of 8 uniaxial accelerometers, arranged with nonparallel axes, can be isolated with the same cost as the 11 possible combinations of 4 biaxial gyroscopes arranged with nonparallel axes.

In contrast to existing "maximum likelihood" methods, it is in addition always possible, within the bounds of intrinsic limits, to detect and isolate simultaneously occurring multiple failures correctly. While this invention has been described with reference to its presently-preferred embodiment, it is not limited thereto. Rather, the present invention is limited only insofar as it is defined by the following set of patent claims and includes within its scope all equivalents thereof.

While this invention has been described with reference to its presently-preferred embodiment, it is not limited thereto. Rather, the present invention is limited only insofar as it is defined by the following set of patent claims and includes within its scope all equivalents thereof.

What is claimed is:

1. A method for minimizing a contributions of sensors affected by possible measuring failures detected by a plurality of redundant interconnected sensors forming a measuring system by detecting and isolating said sensors affected by failures comprising the steps of:

a) mapping the sensor values measured by all of said sensors such that the sensor values are combined to form a measured vector by means of a linear transformation into a measured parity vector; and b) determining a dimension of said vector space by redundancy of the measuring system; then c) determining an absolute magnitude of said parity vector; and d) comparing said magnitude with a first detection threshold; and e) concluding a failure-free state when said magnitude does not exceed said first detection threshold; and f) if said magnitude exceeds said first detection threshold, projecting said measured parity vector onto all subspaces characteristic of the possible failure states wherein dimensions of said subspaces are determined by the number of possible faulty sensors associated with the respective failure state; and g) establishing which projection of the parity vector onto a subspace, respectively belonging to relevant failure determination level, providing the largest proportion of the measured parity vector, in order to isolate said failures; then h) testing whether a residual failure exceeds a second detection threshold; and i) proceeding to step j) when said residual failure does not exceed said second detection threshold while carrying out steps f) and g) with the next failure determination level if said residual failure exceeds said second detection threshold; and then j) determining the best sensor combination by omitting a sensor value combination belonging to the respective subspaces with the largest proportion of the parity vector at the relevant failure determination level.

2. A method as recited in claim 1 further characterized in that:

a) failure isolation is carried out off-line by calculating all possible projections of the parity vectors onto the characteristic subspaces; and b) a calculated result is stored in a table whose elements are employed via a correspondingly coded direction of the parity vector as a table key.

3. A method as recited in claim 1 wherein said detection thresholds are selected by external guidelines.

4. A method as recited in claim 1 wherein at least said first detection threshold is determined by possible noise values and permissible inaccuracies of said sensors.

5. A method as recited in claim 3 wherein a number of sensors is taken into account in the guidelines for the detection thresholds.

* * * * *